United States Patent
Sohn et al.

(10) Patent No.: US 10,457,773 B2
(45) Date of Patent: Oct. 29, 2019

(54) METHOD OF PREPARING POLYALKYLENE CARBONATE RESIN

(71) Applicant: LG CHEM, LTD., Seoul (KR)

(72) Inventors: Jung Min Sohn, Daejeon (KR); Seung Young Park, Daejeon (KR); Jin Woo Lee, Daejeon (KR); Yoon Jung Kim, Daejeon (KR); Taek Jun Jung, Daejeon (KR); Yun Ki Cho, Daejeon (KR); Yong Hee An, Daejeon (KR); Jun Wye Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 162 days.

(21) Appl. No.: 15/515,042

(22) PCT Filed: Dec. 8, 2015

(86) PCT No.: PCT/KR2015/013383
§ 371 (c)(1),
(2) Date: Mar. 28, 2017

(87) PCT Pub. No.: WO2016/093592
PCT Pub. Date: Jun. 16, 2016

(65) Prior Publication Data
US 2017/0226284 A1   Aug. 10, 2017

(30) Foreign Application Priority Data
Dec. 8, 2014  (KR) .................. 10-2014-0174981

(51) Int. Cl.
*C08G 64/40* (2006.01)
*C08G 64/34* (2006.01)
*C08G 64/02* (2006.01)

(52) U.S. Cl.
CPC ......... *C08G 64/40* (2013.01); *C08G 64/0208* (2013.01); *C08G 64/34* (2013.01); *C08G 64/406* (2013.01)

(58) Field of Classification Search
CPC ...... C08G 64/34; C08G 64/403; C08G 64/16; C08J 3/07; C07F 3/06
See application file for complete search history.

(56) References Cited

U.S. PATENT DOCUMENTS

| | | | | |
|---|---|---|---|---|
| 4,833,060 A * | 5/1989 | Nair | ............................ | C08J 3/14 430/108.22 |
| 5,565,557 A * | 10/1996 | Koyama | ................ | C07H 13/06 536/123.13 |
| 6,472,496 B2 | 10/2002 | Matsumoto et al. | | |
| 9,073,049 B2 | 7/2015 | Choi et al. | | |
| 9,162,170 B2 | 10/2015 | Onishi et al. | | |
| 2002/0032299 A1 | 3/2002 | Matsumoto et al. | | |
| 2011/0044859 A1* | 2/2011 | Onishi | ................... | B01D 39/10 422/187 |
| 2011/0054145 A1* | 3/2011 | Chang | .................... | C08G 64/34 528/395 |
| 2011/0201779 A1* | 8/2011 | Cherian | ................. | C08G 64/34 528/405 |
| 2011/0207899 A1 | 8/2011 | Allen et al. | | |
| 2014/0155573 A1* | 6/2014 | Soler | ......................... | C08J 5/18 528/405 |

FOREIGN PATENT DOCUMENTS

| | | |
|---|---|---|
| CN | 1290896 C | 12/2006 |
| CN | 102197063 A | 9/2011 |
| CN | 103842406 A | 6/2014 |
| EP | 1199325 A1 | 4/2002 |
| JP | 10-139809 A | 5/1998 |
| JP | 2921544 B2 | 7/1999 |
| JP | 2921545 B2 | 7/1999 |
| JP | 2000-219737 A | 8/2000 |
| JP | 2006002063 A | 1/2006 |
| JP | 2012-503078 A | 2/2012 |
| JP | 2013503935 A | 2/2013 |
| JP | 5568462 B2 | 8/2014 |
| KR | 10-2011-0055739 A | 5/2011 |
| KR | 10-2012-0110382 A | 10/2012 |
| KR | 10-2013-0116376 A | 10/2013 |
| KR | 10-2016-0047930 A | 5/2016 |

* cited by examiner

*Primary Examiner* — Shane Fang
(74) *Attorney, Agent, or Firm* — Dentons US LLP

(57) ABSTRACT

A method of preparing a polyalkylene carbonate resin is provided. More particularly, a method of preparing a polyalkylene carbonate resin capable of preventing polymer degradation and improving physical properties and quality of a final resin product, in which, after polymerization of polyalkylene carbonate, by-products are removed by using a large amount of water to purify a reaction mixture, and in a subsequence process of removing a catalyst residue, a primary purification method is conducted by using a filter so that a content of the catalyst in the reaction mixture is less than 1% by weight, is provided.

12 Claims, No Drawings

METHOD OF PREPARING POLYALKYLENE CARBONATE RESIN

CROSS-REFERENCE TO RELATED APPLICATION

This application is a National Stage Entry of International Application No. PCT/KR2015/013383, filed on Dec. 8, 2015, and claims the benefit of and priority to Korean Application No. 10-2014-0174981, filed on Dec. 8, 2014, all of which are hereby incorporated by reference in their entirety for all purposes as if fully set forth herein.

TECHNICAL FIELD

The present invention relates to a method of preparing a polyalkylene carbonate resin including a method of effectively removing a catalyst.

BACKGROUND ART

Polyalkylene carbonates are non-crystalline transparent resins. Unlike aromatic polycarbonates that are engineering plastics of a similar type, polyalkylene carbonate has advantages of being biodegradable, of being thermally decomposed at a low temperature, and of being completely decomposed into carbon dioxide and water without a remaining carbon residue.

The preparation of polyalkylene carbonate is conducted in the presence of a chlorinated solvent, and after polymerization, many different impurities are present in the polymerization products.

The production process of polyalkylene carbonate is largely divided into a polymerization process and a post-treatment process. The post-treatment process includes a process of removing residual monomers and impurities other than polyalkylene carbonate and carrying out pelletization of the polyalkylene carbonate.

Kinds of the residual monomers recovered and the impurities removed in the post-treatment process are as follows.

The residual monomers include carbon dioxide and ethylene oxide, and the impurities include catalyst residues, by-products, and solvents.

The catalyst residues include Zn-based catalysts and the by-products include ethylene carbonate.

Among them, the catalyst residues induce polymer degradation when they are not removed. Therefore, it is very important to remove the catalyst residues.

However, the existing methods have a problem of polymer degradation which is caused by the presence of a part of the catalyst residues.

DISCLOSURE

Technical Problem

An object of the present invention is to provide a method of preparing a polyalkylene carbonate resin with excellent quality, in which, during a process of preparing a resin including polyalkylene carbonate, by-products are removed using a large amount of water after polymerization and then a catalyst used in the preparation of the resin is effectively removed by using a filter having a particular pore size.

Another object of the present invention is to provide a method of preparing a polyalkylene carbonate resin capable of further improving quality of the resin, in which the catalyst is more effectively removed from the reaction mixture by two catalyst purification methods of selectively further using an ion exchange resin after using the filter.

Technical Solution

The present invention provides a method of preparing a polyalkylene carbonate resin, the method including the steps of:

preparing a reaction mixture including polyalkylene carbonate, a catalyst residue, unreacted residual monomers, a solvent, and alkylene carbonate-containing by-products by polymerizing monomers including carbon dioxide and an epoxide compound in the presence of the catalyst and the solvent;

recovering residual monomers from the reaction mixture;

removing the by-products from the reaction mixture, from which the residual monomers have been removed, by using 200 parts by weight to 1000 parts by weight of water with respect to 100 parts by weight of the monomers;

removing the catalyst residue from the reaction mixture, from which the residual monomers and the by-products have been removed, by using a filter having a pore size of less than 50 um; and removing the solvent from the reaction mixture, from which the residual monomers and the catalyst residue have been removed.

Further, the step of removing the by-products may include the step of removing the by-products from the reaction mixture in a rotating disc contactor-type extraction column by using water.

The step of recovering the residual monomers may be conducted by a method of removing carbon dioxide by venting and removing the epoxide compound by distillation.

Preferably, a pore size of the filter may be less than 20 um.

Most preferably, the pore size of the filter may be 1 um to 10 um.

The step of removing the catalyst residue may include the step of removing the catalyst residue by passing the reaction mixture through the filter so that a content of the catalyst is less than 1% by weight based on the total weight of the reaction mixture.

The step of removing the catalyst residue may further include the step of successively using an ion exchange resin after using the filter.

Preferably, the method may include the step of removing the catalyst residue by primarily removing the catalyst residue from the reaction mixture, from which the residual monomers and the by-products have been removed, through the filter, and then by secondarily removing the catalyst residue from the reaction mixture by using the ion exchange resin so that the content of the catalyst is 300 ppm or less based on the total weight of the reaction mixture.

The method of the present invention may further include the step of purifying the monomers, prior to the polymerization step.

The step of removing the solvent may be conducted by using a combination of one or more instruments selected from the group consisting of a simple flash drum, a falling film evaporator, a thin film evaporator, an extrusion DV, and a filmtruder.

The catalyst may be a zinc-based catalyst, and the by-products may include an alkylene carbonate having 1 to 5 carbon atoms.

The epoxide compound may be one or more selected from the group consisting of: an alkylene oxide having 2 to 20 carbon atoms substituted or unsubstituted with a halogen or an alkyl group having 1 to 5 carbon atoms; a cycloalkylene oxide having 4 to 20 carbon atoms substituted or unsubstituted with a halogen or an alkyl group having 1 to 5 carbon atoms; and a styrene oxide having 8 to 20 carbon atoms substituted or unsubstituted with a halogen or an alkyl group having 1 to 5 carbon atoms, and the solvent may be methylene chloride or ethylene dichloride.

The monomer of the polyalkyl(meth)acrylate may be an ester of (meth)acrylic acid and an alkyl group having 1 to 20 carbon atoms.

Effect of the Invention

In the present invention, during a process of preparing a polyalkylene carbonate resin, by-products are removed by using a large amount of water after polymerization of polyalkylene carbonate, and a catalyst residue is removed by using a filter having a particular pore size during a process of removing the catalyst residue so that a content of the catalyst is less than 1% by weight, leading to improvement of physical properties of a product.

Further, in the present invention, two purification methods of selectively further using an ion exchange resin after using the filter are conducted successively to reduce the catalyst content in a reaction mixture to 300 ppm or less.

Therefore, the present invention may continuously produce resin products with improved physical properties by successively removing factors that adversely affect physical properties of the products.

DETAILED DESCRIPTION OF THE EMBODIMENTS

Hereinafter, the present invention will be described in more detail.

The terms or words used in the specification and the claims should not be construed as limited to ordinary or dictionary meanings, and should be interpreted as meanings and concepts corresponding to the technical idea of the invention, based on the principle that inventors can appropriately define the concepts of terms in order to explain one's own invention in the best way.

Further, the term "including" used herein specifies a specific feature, region, integer, step, action, factor, and/or component, but does not exclude the presence or addition of a different specific feature, region, integer, step, action, factor, and/or component.

Hereinbelow, a method of preparing a polyalkylene carbonate resin according to a preferred embodiment of the present invention will be described in more detail.

According to an embodiment of the present invention, a method of preparing a polyalkylene carbonate resin is provided, the method including the steps of: preparing a reaction mixture including polyalkylene carbonate, a catalyst residue, unreacted residual monomers, a solvent, and alkylene carbonate-containing by-products by polymerizing monomers including carbon dioxide and an epoxide compound in the presence of the catalyst and the solvent; recovering residual monomers from the reaction mixture; removing the by-products from the reaction mixture, from which the residual monomers have been removed, by using 200 parts by weight to 1000 parts by weight of water with respect to 100 parts by weight of the monomers; removing the catalyst residue from the reaction mixture, from which the residual monomers and the by-products have been removed, by using a filter having a pore size of less than 50 um; and removing the solvent from the reaction mixture, from which the residual monomers and the catalyst residue have been removed During the process of preparing the polyalkylene carbonate resin according to the present invention, by-products may be removed by using a large amount of water after polymerization, thereby providing an effect of greatly improving physical properties of the final product.

Further, according to the present invention, in the step of removing the catalyst residue, a primary purification method of using a filter having a predetermined pore size is conducted, or selectively, a secondary method of additionally using an ion exchange resin is conducted successively, thereby preventing polymer degradation and improving quality of the resin, compared to the existing methods.

That is, most of the catalyst residue may be removed by the primary purification method of using the filter, but the secondary purification method of using the ion exchange resin may be additionally conducted when the content of the catalyst is high even after the primary purification method of using the filter.

Therefore, the present invention may further reduce the content of the catalyst in the reaction mixture by using the ion exchange resin.

Preferably, the present invention may remove the catalyst residue by using the filter so that the content of the catalyst in the reaction mixture is less than 1% by weight.

Further, in the process of removing the catalyst, the ion exchange resin may be used after using the filter so that the content of the catalyst in the reaction mixture is 300 ppm or less.

The present invention may prepare the resin composition continuously from the monomer injection, and after the polymerization, the monomers may be recovered and reused to reduce the manufacturing cost.

Additionally, the present invention may improve physical properties by successively removing factors that adversely affect the physical properties of the products, after polymerization.

Each step of the method of preparing the polyalkylene carbonate resin of the present invention will be described in more detail.

First, the method of the present invention may include the step of purifying monomers prior to polymerization of the monomers. Preferably, the solvent may also be purified and used. This step is one of preparing the epoxide compound and carbon dioxide used for the reaction by purifying them.

Specifically, according to the method, the carbon dioxide and the alkylene oxide compound used as raw materials, and the solvent, are purified prior to polymerization so that a water content of the monomers is maintained at less than 10 ppm. A method of passing the raw materials through a molecular sieve-packed column may be conducted. The step of purifying the monomers may include the step of passing the monomers through the molecular sieve-packed column so that the water content of the monomers is less than 10 ppm.

Further, the polymerization step conducted after the above process is a step of preparing polyalkylene carbonate by injecting the raw materials into a polymerization reactor and conducting polymerization in the presence of the catalyst.

That is, although the method of preparing polyalkylene carbonate of the present invention is not particularly limited, for example, polyalkylene carbonate may be obtained by copolymerization of the above-described alkylene oxide and carbon dioxide.

Alternatively, polyalkylene carbonate may be obtained by ring opening polymerization of a circular carbonate. The copolymerization of alkylene oxide and carbon dioxide may be conducted in the presence of a complex compound of a metal such as zinc, aluminum, cobalt, etc.

Therefore, the polymerization step according to a preferred embodiment of the present invention may include the step of introducing the catalyst, the solvent, the epoxide compound, and carbon dioxide into a polymerization reactor, and then conducting solution polymerization of the monomers including the epoxide compound and the carbon dioxide in the presence of the catalyst and the solvent. This polymerization may be continuous polymerization.

After the solution polymerization is completed, a reaction mixture is produced. This reaction mixture includes the polyalkylene carbonate, the unreacted residual monomers, the catalyst residue, the solvent, and by-products. The unreacted residual monomers include unreacted carbon dioxide and unreacted alkylene oxide.

The polymerization process may be conducted at 50° C. to 100° C. and 20 bar to 40 bar for 2 h to 10 h. An autopolymerization temperature of the epoxide compound, in particular, ethylene oxide, is 90° C., and therefore, in order to reduce the content of by-products due to autopolymerization, the solution polymerization may be more preferably conducted at a temperature of 60° C. to 90° C.

Next, the present invention performs the step of removing unreacted residual monomers and impurities from the reaction mixture. The present invention sequentially then performs the step of removing the catalyst residue, the step of removing the by-products, and the step of removing the solvent from the reaction mixture as described below.

The epoxide compound such as ethylene oxide of the residual monomers is an unstable substance that should not be in contact with moisture, and therefore it should be immediately recovered and a remaining amount thereof in a product should be minimized Therefore, the present invention performs a process of removing the catalyst residue after recovering the residual monomers from the reaction mixture. The residual monomers are recovered after polymerization and reused, thereby reducing the manufacturing costs. The residual monomers may adversely affect physical properties of the products after polymerization, and the present invention may improve the physical properties by successively removing these factors after polymerization.

The step of recovering the residual monomers may be conducted by a method of removing carbon dioxide by venting and removing the epoxide compound by distillation. Most of the unreacted epoxide compound may be primarily removed from a polymer solution by distillation of the polymer solution, a solvent such as methylene chloride is recovered together therewith, and then the epoxide compound may be secondarily recovered by a thin film evaporator.

Next, the present invention performs the step of removing by-products from the reaction mixture from which the residual monomers have been removed.

When the by-products remain in the resin, they adversely affect physical properties of the resin such as reduction in a glass transition temperature, etc., and therefore the by-products are preferably removed during the process of preparing polyalkylene carbonate. The by-products may include alkylene carbonate having 1 to 5 carbon atoms, for example, ethylene carbonate.

Therefore, the present invention removes by-products by using a large amount of water to purify the reaction mixture before removal of the catalyst, and thus a glass transition temperature may be maintained within a range required for the resin, and the factors that adversely affect physical properties of final products may be prevented, thereby contributing to improvement of physical properties.

According to a preferred embodiment of the present invention, the step of removing the by-products from the reaction mixture from which the residual monomers have been removed by using 200 parts by weight to 1000 parts by weight or 300 parts by weight to 600 parts by weight of water with respect to 100 parts by weight of the monomers may be included. If the amount of water is too small upon removal of the by-products, there is a problem that by-products are not removed. Further, even though a large amount of water is used, excessive use of water increases consumption of water, and therefore the amount of waste water is undesirably increased.

In the present invention, the step of removing the by-products may be conducted by using water after packing the reaction mixture in a rotating disc contactor-type extraction column.

The length and surface area of the extraction column are not particularly limited, and may be appropriately changed depending on the amount of the reactant.

According to the method, the present invention may effectively remove the by-products, thereby providing the reaction mixture including the polyalkylene carbonate, the catalyst residue, the unreacted residual monomer, and the solvent.

Further, the present invention may perform the step of removing the catalyst residue from the reaction mixture from which the residual monomers and the by-products have been removed by using a filter having a pore size of less than 50 um, after removing the by-products from the reaction mixture.

In this regard, the catalyst promotes depolymerization as well as polymerization. Therefore, after the polymerization is completed, a step of removing the residual monomer and then removing the catalyst is required.

With regard to the method of removing the catalyst residue, a primary purification method of using a filter having a predetermined pore size is conducted, or selectively, a secondary method of additionally using an ion exchange resin is conducted successively. Preferably, in the step of removing the catalyst residue according to the present invention, the primary purification method of using the filter and the secondary method of using the ion exchange resin may be conducted successively.

The pore size of the filter may be preferably less than 50 um, more preferably less than 20 um, and most preferably 1 um to 10 um. In this regard, the pore size of the filter in the present invention may not include 50 um. If the pore size of the filter includes 50 um or more, a large amount of the catalyst is present in the reaction mixture, and therefore physical properties may be deteriorated and the product may become opaque and the processability of the product may become poor.

The filter may be made of a metal, polymer, or paper, and a thin surface filter, a thick depth filter, etc., may be used.

However, the catalyst removal efficiency may be increased by a certain level depending on the use time of the filter, but a flow rate of the product passing through the filter is decreased. If the flow rate decreases, there is a problem that the filter needs to be cleaned or periodically replaced. Therefore, to further increase the catalyst removal efficiency, the present invention additionally uses the ion exchange resin in the step of removing the catalyst.

In this regard, although the ion exchange resin is very effective in removing the catalyst, ions are mixed in the product due to a mechanism whereby the catalyst is removed by exchanging ions. When the amount of the ions is increased, there is a problem that decomposition of the polymer is promoted. Further, since efficiency of the ion exchange resin decreases over time of use, a step of regenerating the ion exchange resin at regular intervals may be needed.

In the process of removing the catalyst from the reaction mixture by the two purification methods, when the order of the two purification methods is changed to conduct primary purification by using the ion exchange resin and then to conduct a secondary purification method by using the filter, the resin should be more frequently regenerated due to a high load, which is undesirable.

The primary purification method may include the step of passing the reaction mixture through the filter so that the content of the catalyst is less than 1% by weight, based on the total weight of the reaction mixture.

The secondary purification method may include the step of treating the reaction mixture purified through the filter with the ion exchange resin so that the content of the catalyst is 300 ppm or less, based on the total weight of the reaction mixture.

In this regard, filter cleaning and catalyst recovery may be conducted through periodic backwashing. In the present invention, the surface filter and the depth filter may be used alone or in combination.

Meanwhile, the present invention performs the step of removing the solvent from the reaction mixture from which the residual monomer, the by-products, and the catalyst residue have been removed.

In a solution polymerization, the polymer may be degraded by backbiting due to the catalyst and heat, and ethylene carbonate as a by-product may be generated in the polymerization mechanism.

Further, as the solvent is removed, viscosity may be rapidly increased and the volatilization efficiency may be rapidly decreased. Accordingly, in the present invention, a process of sequentially removing the solvent by using different types of equipments according to the viscosity range of the reaction mixture is conducted.

Preferably, the step of removing the solvent may be conducted by using a combination of one or more instruments selected from the group consisting of a simple flash drum, a falling film evaporator, a thin film evaporator, an extrusion DV, and a filmtruder. The instruments for removing the solvent are well known in the art, and therefore specific descriptions thereof will be omitted.

The present invention may further include the step of recovering the polyalkylene carbonate resin after it is formed. Further, the recovered polyalkylene carbonate resin may be pelletized according to a method that is well known in the art.

According to this successive method of preparing the polyalkylene carbonate resin, a variety of products may be obtained through processing. For example, the resin products may include a film, a sheet, a film laminate, a filament, a non-woven fabric, a molded product, etc.

When the polyalkylene carbonate of the present invention is used, a variety of known methods may be used for molding the products.

A method of obtaining a homogeneous mixture may be exemplified by one of using a Henschel mixer, a ribbon blender, a blender, etc. For melt-kneading, a VAN Antonie Louis Barye mixer, a uniaxial or biaxial compressor, etc., may be used. A shape of the resin composition of the present invention is not particularly limited, and for example, it may be processed into a strand, a sheet, a flat panel, a pellet, etc.

A method of obtaining a molded product by molding the resin of the present invention may include, for example, injection molding, compression molding, injection compression molding, gas assisted injection molding, foaming injection molding, inflation, T die molding, calendar molding, blow molding, vacuum molding, pressure molding, etc.

In the present invention, pelletization by compression molding is employed. This pelletization process includes a process of preparing the reaction mixture in a pellet form by injecting the reaction mixture into a twin screw extruder. As described above, in the pelletization process, pellets having a size of 1 mm to 5 mm are preferably prepared.

Substances used in the solution polymerization are described in more detail as follows.

The epoxide compound may be one or more selected from the group consisting of: an alkylene oxide having 2 to 20 carbon atoms substituted or unsubstituted with a halogen or an alkyl group having 1 to 5 carbon atoms; a cycloalkylene oxide having 4 to 20 carbon atoms substituted or unsubstituted with a halogen or an alkyl group having 1 to 5 carbon atoms; and a styrene oxide having 8 to 20 carbon atoms substituted or unsubstituted with a halogen or an alkyl group having 1 to 5 carbon atoms. More preferably, the epoxide compound may include an alkylene oxide having 2 to 20 carbon atoms substituted or unsubstituted with a halogen, or an alkyl group having 1 to 5 carbon atoms.

Specific examples of the epoxide compound may include ethylene oxide, propylene oxide, butene oxide, pentene oxide, hexene oxide, octene oxide, decene oxide, dodecene oxide, tetradecene oxide, hexadecane oxide, octadecene oxide, butadiene monoxide, 1,2-epoxy-7-octene, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxynorbornen, limonene oxide, dieldrin, 2,3-epoxypropylbenzene, styrene oxide, phenylpropylene oxide, stilbene oxide, chlorostilbene oxide, dichlorostilbene oxide, 1,2-epoxy-3-phenoxypropane, benzyloxymethyl oxirane, glycidyl-methylphenyl ether, chlorophenyl-2,3-epoxypropyl ether, epoxypropyl methoxyphenyl ether, biphenyl glycidyl ether, glycidyl naphthyl ether, etc. Preferably, the epoxide compound may be ethylene oxide.

The carbon dioxide may be continuously or non-continuously introduced during the reaction, but may preferably be continuously introduced, and in this case, as a polymerization reactor, a semi-batch type or a closed batch system may be preferably used. If carbon dioxide is not continuously introduced, by-products such as polyethylene glycol, etc. may increase, regardless of the copolymerization of carbonate aimed for in the present invention. When carbon dioxide is continuously introduced in the polymerization, a reaction pressure may be 5 bar to 50 bar, or 10 bar to 40 bar.

A molar ratio of carbon dioxide to the epoxide compound may be at 1:1 to 10:1. More preferably, the molar ratio of carbon dioxide to the epoxide compound may be at 2:1 to 5:1. When carbon dioxide is introduced at the above ratio, the semi-batch type of system may be preferably used as the polymerization reactor.

The catalyst used in the present invention may be a complex compound of a metal such as zinc, aluminum, cobalt, etc., and is preferably a zinc-based catalyst. The zinc-based catalyst is not limited to a particular type, and a zinc complex compound that is well known in the art may be used.

A molar ratio of the catalyst to the epoxide compound may be 1:50 to 1:1000, and more preferably, the molar ratio of the catalyst to the epoxide compound may be 1:70 to 1:600, or 1:80 to 1:300. If the ratio is lower than 1:50, it may be difficult to exhibit sufficient catalytic activity in the solution polymerization, and if the ratio is higher than 1:1000, it may not be efficient due to the excessive use of the catalyst, by-products may be generated, or a molecular weight may be decreased due to back-biting of the polymer by heating in the presence of a catalyst, and a production amount of cyclic carbonate may increase.

Further, a weight ratio of the solvent to the epoxide compound is preferably 1:0.1 to 1:100, and more preferably 1:1 to 1:10. The solvent may be methylene chloride or ethylene dichloride.

Hereinafter, preferable examples of the present invention will be explained in detail. However, these examples are only to illustrate the present invention, and the scope of the present invention is not limited thereto.

EXAMPLE 1

A polymerization reactor, an extruder for pelletization, a water supply tank for removing by-products, a centrifugal dryer, and a pellet recovery device were connected and installed, and then a resin composition including polyethylene carbonate was continuously prepared.

First, an autoclave reactor equipped with a stirrer was used as a polymerization reactor, and a dried diethyl-zinc catalyst, a solvent, ethylene oxide (EO), and carbon dioxide were introduced to this reactor. Solution polymerization was conducted under the conditions of the following Table 1 to prepare polyethylene carbonate. In this regard, the ethylene oxide (EO), carbon dioxide, and solvent were purified prior to the polymerization so that their water contents were maintained at less than 10 ppm.

TABLE 1

|  |  | Example 1 |
|---|---|---|
| Cat. amt | (g) | 8 |
| EO | (g) | 180 |
| solvent (MC) | (g) | 900 |
| EO/cat. |  | 99.8 |
| $CO_2$ | (bar) | 40 |
| Temperature | (° C.) | 70 |
| Time | (h) | 4 |
| Yield | (g) | 90.5 |
| Yield | (g/g-cat) | 11 |
| Activity | (g/g-cat · h) | 2.83 |
| Conversion rate of EO | (%) | 24 |
| TOF | (mol/mol-cat · hr) | 6.28 |

After the solution polymerization was completed under the above conditions, unreacted ethylene oxide was removed from the reaction mixture, in which the content of the catalyst residue was minimized, by dissolving it in MC under reduced pressure, and carbon dioxide was removed by venting.

Thereafter, the reaction mixture obtained by the above process was packed into a rotating disc contactor-type of extraction column, and purified by using water in the extraction column to remove a by-product, ethylene carbonate (EC). Water was used in an amount of 500 parts by weight based on 100 parts by weight of ethylene oxide.

The catalyst residue was primarily removed by using a filter (with a pore size of 5 um) so that the content of the catalyst was less than 1% by weight, based on the total content of the reaction mixture. The results of the final catalyst contents are summarized in the following Table 2.

Next, MC was removed from the reaction mixture by an ordinary volatilization method, and pellets were prepared by using a twin screw extruder (BA-19, manufactured by BAUTECH).

Thereafter, the pellets were transferred to a centrifugal dryer and dried, and then passed through a pellet recovery device to obtain a final pellet specimen (that is, a CAM resin composition including polyethylene carbonate, polylactide, and PMMA).

Production of the recovered pellet specimen was confirmed by nuclear magnetic resonance spectrum, and a weight average molecular weight analyzed by GPC was confirmed as 230,000 g/mol.

EXAMPLE 2

Polyethylene carbonate was prepared in the same manner as in Example 1, except that the catalyst was removed by using the filter and then secondarily removed by using an ion exchange resin.

COMPARATIVE EXAMPLE 1

Polyethylene carbonate was prepared in the same manner as in Example 1, except that a filter having a pore size of 50 um was used.

EXPERIMENTAL EXAMPLE

The final catalyst contents of Examples 1 and 2 and Comparative Example 1 are shown in Table 2.

TABLE 2

|  | Example 1 | Example 2 | Comparative Example 1 |
|---|---|---|---|
| Pore size of filter (um) | 5 | 5 | 50 |
| Use of ion exchange resin | X | ◯ | ◯ |
| Final catalyst content (ppm) | 100 | 50 | 14,000 |

Evaluation Test of Physical Properties

With respect to the resin composition specimens prepared in the examples and the comparative example, extrudability, pellet condition, and sheet processability were evaluated, and tensile strength, elongation, and haze were measured according to the following methods.

(1) Extrudability: During the process of preparing the specimens, the procedures of extruding the resin compositions were examined with the naked eye, and extrudability was evaluated as four grades: very good (⊚), good (◯), moderate (Δ), and poor (X).

(2) Pellet condition: About 20 g of the pellets including each of the resin compositions of the examples and comparative example were put into a convection oven under a load of about 200 g, and then heat-treated at about 40° C. for about 30 minutes. Thereafter, the condition, the blocking degree, and the like of the pellets including each of the resin compositions were examined with the naked eye, and evaluated as four grades: very good (◎), good (○), moderate (Δ), and poor (X).

(3) Sheet processability: Each specimen was preheated at 170° C. for 1 minute, and then compressed under a pressure of 300 bar for 2 minutes using a hot press machine to provide a sheet, and sheet processability was tested.

The manufactured sheets were examined with the naked eye. When no air bubbles were generated in the sheet, it was evaluated as very good (◎) or good (○), and when air bubbles were generated in the sheet, it was evaluated as moderate (Δ) or poor (X).

(4) Haze (%): A specimen having a length of 5 cm, a width of 5 cm, and a thickness of 0.18 mm was manufactured, and haze was measured using a Nippon Denshoku Haze Meter in accordance with ASTM D 1003.

When light having a wavelength of 400 nm to 700 nm was transmitted through the specimen, a ratio of scattered light to total transmitted light was indicated as opacity (haze, %).

(Evaluation criteria for transparency: when a film was processed, a letter-printed paper was placed on the back of the film. When the letters were visible, it was determined as very transparent; when the letters were visible but not clear, it was determined as transparent, while when the letters were not visible, it was determined as opaque.)

The evaluation and measurement results thereof are summarized in the following Table 3.

TABLE 3

| | Extrudability | Pellet condition | Sheet processability | Haze (%) |
|---|---|---|---|---|
| Example 1 | Very good (◎) | Very good (◎) | Very good (◎) | Very transparent |
| Example 2 | Very good (◎) | Very good (◎) | Very good (◎) | Very transparent |
| Comparative Example 1 | Poor (X) | Poor (X) | Poor (X) | Opaque |

The results of Table 3 show that Examples 1 and 2 of the present invention had very good extrudability and pellet condition, and also very good sheet processability and haze, compared to Comparative Example 1.

Although specific parts of the present invention have been described in detail, it would be obvious to one of ordinary knowledge in the art that such specific technologies are no more than preferable embodiments, and the scope of the present invention is not limited thereto.

Thus, the substantial scope of the present invention is defined by the appended claims and equivalents thereof.

The invention claimed is:

1. A method of preparing a polyalkylene carbonate resin, the method comprising the sequential steps of:
preparing a reaction mixture comprising polyalkylene carbonate, a catalyst residue, unreacted residual monomers, a chlorinated solvent, and alkylene carbonate-comprising by-products by polymerizing monomers comprising carbon dioxide and an epoxide compound in the presence of the catalyst and the chlorinated solvent;
recovering residual monomers from the reaction mixture;
removing the by-products from the reaction mixture, from which the residual monomers have been removed, by using 200 parts by weight to 1000 parts by weight of water with respect to 100 parts by weight of the monomers;
removing the catalyst residue from the reaction mixture, from which the residual monomers and the by-products have been removed, by using a filter having a pore size of less than 50 um; and
removing the chlorinated solvent from the reaction mixture, from which the residual monomers and the catalyst residue have been removed.

2. The method of preparing the polyalkylene carbonate resin of claim 1, wherein the step of removing the by-products is conducted by using water after packing the reaction mixture in a rotating disc contactor-type extraction column.

3. The method of preparing the polyalkylene carbonate resin of claim 1, wherein the step of recovering the residual monomers is conducted by a method of removing carbon dioxide by venting and removing the epoxide compound by distillation.

4. The method of preparing the polyalkylene carbonate resin of claim 1, wherein a pore size of the filter is less than 20 um.

5. The method of preparing the polyalkylene carbonate resin of claim 1, wherein a pore size of the filter is 1 um to 10 um.

6. The method of preparing the polyalkylene carbonate resin of claim 1, wherein the step of removing the catalyst residue is conducted by passing the reaction mixture through the filter so that a content of the catalyst is less than 1% by weight.

7. The method of preparing the polyalkylene carbonate resin of claim 1, wherein the step of removing the catalyst residue further comprises the step of successively using an ion exchange resin after using the filter.

8. The method of preparing the polyalkylene carbonate resin of claim 7, comprising the step of removing the catalyst residue by primarily removing the catalyst residue from the reaction mixture, from which the residual monomers and the by-products have been removed, through the filter, and then by secondarily removing the catalyst residue from the reaction mixture by using the ion exchange resin so that a content of the catalyst is 300 ppm or less based on the total weight of the reaction mixture.

9. The method of preparing the polyalkylene carbonate resin of claim 1, further comprising the step of purifying the monomers, prior to the polymerization step.

10. The method of preparing the polyalkylene carbonate resin of claim 1, wherein the step of removing the chlorinated solvent is conducted by using a combination of one or more instruments selected from the group consisting of a simple flash drum, a falling film evaporator, a thin film evaporator, a devolatilizing extruder, and a filmtruder.

11. The method of preparing the polyalkylene carbonate resin of claim 1, wherein the catalyst is a zinc-based catalyst, and the by-products comprise an alkylene carbonate having 1 to 5 carbon atoms.

12. The method of preparing the polyalkylene carbonate resin of claim 1, wherein the epoxide compound is one or more selected from the group consisting of: an alkylene oxide having 2 to 20 carbon atoms substituted or unsubstituted with a halogen or an alkyl group having 1 to 5 carbon atoms; a cycloalkylene oxide having 4 to 20 carbon atoms substituted or unsubstituted with a halogen or an alkyl group having 1 to 5 carbon atoms; and a styrene oxide having 8 to 20 carbon atoms substituted or unsubstituted with a halogen or an alkyl group having 1 to 5 carbon atoms, and the chlorinated solvent is methylene chloride or ethylene dichloride.

* * * * *